Aug. 4, 1942.  H. NEUWIRTH  2,291,748
TRIPOD
Filed April 26, 1941
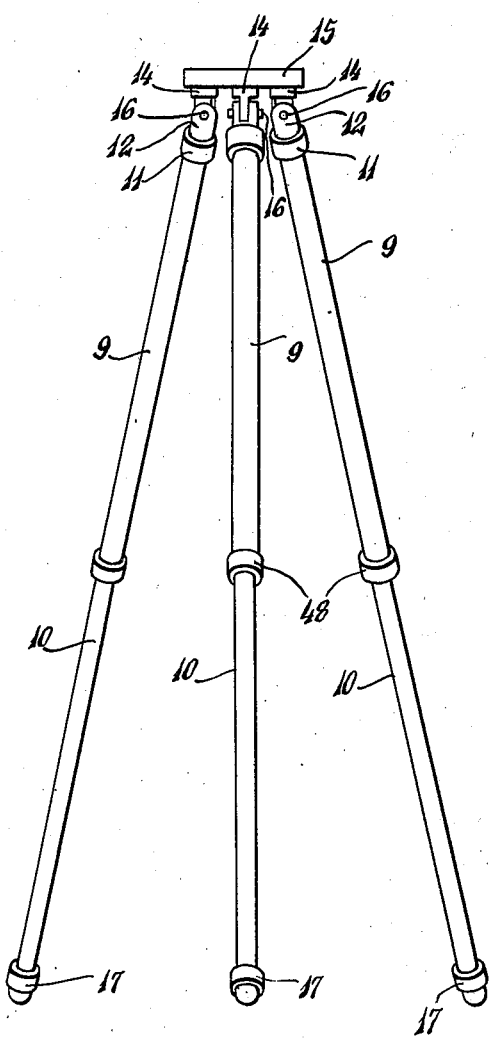
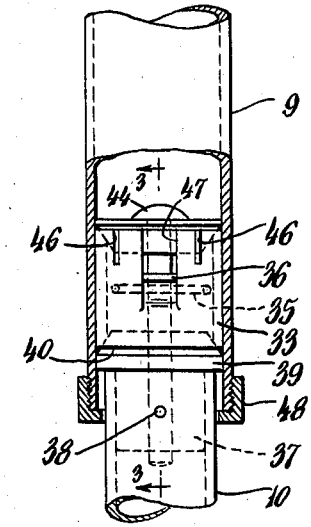
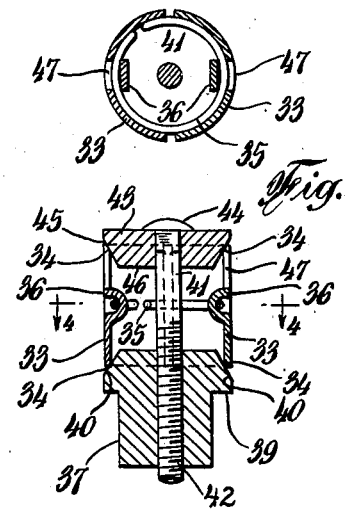
INVENTOR
*H. Neuwirth*
BY *John A. Seifert*
ATTORNEY Patented Aug. 4, 1942

2,291,748

UNITED STATES PATENT OFFICE 2,291,748

TRIPOD

Herman Neuwirth, Brooklyn, N. Y., assignor to Testrite Instrument Company, Inc., New York, N. Y., a corporation of New York Application April 26, 1941, Serial No. 390,439

5 Claims. (Cl. 248—191)

This invention relates to tripods for supporting cameras or other similar instruments and having telescoping leg sections of successively increased diameter adapted to be adjusted to desired lengths for the purposes of varying the height of the tripod while in use and to place the tripod in condition to be transported or stored, and particularly to means for securing the leg sections in adjusted positions relative to their lengths and which has been divided out of my pending application Serial No. 359,184, filed October 1, 1940.

It is an object of the invention to provide an expansible member for securing telescoping sections of the supporting legs of a tripod to each other which is inexpensive to manufacture and comprises like mating portions yieldingly connected to each other and urged to predetermined position and connected to one of said sections by a member adjustable by the rotation of said section to expand said mating portions into impingement with the other telescoping section.

Another object of the invention is to provide an expansible member to secure telescoping leg sections to each other which is of a material different than the material of the telescoping sections to increase the friction between the expansible member and the leg sections in the securing position of the expansible member.

Other objects and advantages of the invention will be set forth in the detail description of the invention.

In the drawing accompanying and forming a part of the application, Figure 1 is a view of a tripod having the sections of the supporting legs thereof adjusted to support a desired instrument.

Figure 2 is a fragmentary view, on an enlarged scale, of the sections of a tripod supporting leg with the leg section of larger diameter in section to show an expansible member carried by the leg section of smaller diameter in expanded condition to secure the leg sections in adjusted position relative to their lengths.

Figure 3 is a sectional view taken on the line 3—3 of Figure 2 looking in the direction of the arrows and showing the expansible member in normal position.

Figure 4 is a cross sectional view taken on the line 4—4 of Figure 3 looking in the direction of the arrows to show the yielding connection of the mating portions of the expansible member to each other.

The embodiment of the invention is illustrated in the accompanying drawing in connection with a tripod comprising three supporting legs, each leg consisting of a plurality of telescoping leg sections and shown in the present instance as composed of two tubular sections 9 and 10 of proportionally or successively increased diameters, the sections 9 of greater diameter having a cap member 11 fixed on the upper end thereof and arranged with a pair of spaced parallel ears 12 extending perpendicularly from the closed end of the cap and having alined perforations. The ears 12 are adapted to be engaged on opposite sides of ears 14 fixed to and extended from the under face of a head or top 15 arranged to support a camera or other similar instrument and the ears 12 and 14 are pivotally connected to each other by a pin engaged in the alined perforations in the ears 12 and an alined perforation in the ears 14, as shown at 16 in Figure 1. It is to be understood that the mounting of the legs on the head 15 and the structure of the head may be of any conventional form as said mounting and head do not constitute a part of this invention.

The upper portion of the lower leg sections 10 of reduced diameter is slidably engaged in the lower end of the leg sections 9 and the lower end of the leg sections 10 is arranged with a suitable support engaging foot 17 mounted on said end, as shown in Figure 1. The leg sections 9 and 10 are shown as of cylindrical tube form but may be of square tube form without digressing from the invention.

The embodiment of the invention comprises means to secure the leg sections 9 and 10 in predetermined position relative to their lengths in the form of an expansible and contractible member adapted to be adjusted to positions to secure the leg sections to each other or to release and permit longitudinal movement of the leg sections 10 into and out of the leg sections 9 to vary the lengths of the legs by rotating the leg sections 10 in opposite directions.

The expansible member for securing the leg sections 10 in adjusted position in the leg sections 9, comprises a plurality of mating portions of arcuate shape in cross section, shown in the present instance as being of two portions 33 of semicircular shape extending in an arc of 180 degrees and having the opposite end edges beveled inwardly toward the concave surface of said portions, as shown at 34 in Figure 3, and yieldingly connected to each other by a split annular resilient member 35, shown in the present instance in Figure 4 as formed from resilient wire curved to circular shape with the ends spaced from each other. The resilient member 35 is retained within the concave surface of the expansible portions 33 by engaging said member in ears or eyelets 36 formed by severing sections from the material of the portions 33 and bending said severed sections into eyelet form, as shown in Figure 3. The resilient member 35 is shaped to form a circle which will position the portions 33 in spaced relation to each other and form a circumference corresponding to the inner circumference of the leg sections 9.

The expansible portions 33 are mounted on the inner end of the leg sections 10 engaged in the leg sections 9 by a plug having a portion 37 of reduced diameter engaged and secured in the inner end of the leg sections 10 by pins or screws, as shown at 38 in Figure 2, and a head 39 of increased diameter intermediate the inner diameters of the leg sections 9 and 10 having an annular beveled face 40 inclining from the periphery to the outer end of the head to engage the beveled edges 34 at the lower ends of the portions 33 of the expansible member. The expansible member is adjustably retained in engagement with the beveled face 40 of the plug head 39 by a shank 41 having screw threads on one end to engage screw threads in an opening extending centrally through the plug 37, as shown at 42 in Figure 3, and having a disk shaped had 43 fixed on the opposite end by a square portion on the shank engaging a corresponding opening in said head and a head on the shank abutting the outer face of the disk head, as shown at 44 in Figure 3. The periphery of the disk head 43 is tapered from the outer face to the inner face to form an annular beveled face 45 to engage the beveled edges 34 at the upper ends of the portions 33 of the expansible member.

In the normal condition of the expansible member, the shank 41 is adjusted into the plug 37 fixed in the leg sections 10 to engage the beveled edges 34 of said expansible member with the beveled face 40 of the plug and the beveled face 45 of the disk head 43, so that the engagement of the leg sections 10 into the leg sections 9 will cause the expansible portions 33 to contact the wall of the bore of the leg sections 9 and hold the disk head 43 against rotation under the inherent tension of the resilient member 35, but said contact between the expansible member and the bore of the leg sections 9 will not interfere with the sliding movement of said expansible member with the leg sections 10 in the leg sections 9. The expansible member is actuated into impingement with the wall of the bore of the leg sections 9 to hold the leg sections 10 in adjusted position to provide tripod supporting legs of desired lengths by rotating the leg sections 10 in a direction to screw the shank 41 into the plug 37, and move the disk head 43 toward the plug to cause inward movement of the beveled faces 40 and 45 relative to the beveled edges 34 and the outward spreading or expanding of the expansible portions 33 into impingement with the wall of the bore of the leg sections 9. The expansible member is released from impingement with the bore of the leg sections 9 by rotating the leg sections 10 in the opposite direction to screw the shank 41 out of the plug 37 under the force of the resilient member 35 until the expansible portions 33 are in their normal position under the sole force of said resilient member 35.

To assure frictional engagement between the expansible member and the head 43 and prevent rotation of said head and shank 41, the portions 33 of the expansible member are arranged with slots 46 extended inwardly from the beveled edges 34 engaged with the beveled face 45 and disposed intermediate recesses 47 formed by the portions forming the eyelets 36, as shown in Figure 2.

To increase the frictional contact between the expansible member and the bore of the leg sections 9 when said expansible member is adjusted to expanded position into impingement with the wall of the bore of the leg sections 9, the leg sections are of a different material than the material of the expansible member. Satisfactory results have been obtained by making the leg sections of aluminum tubing and the expansible member and the heads 39 and 43 of brass or bronze.

The leg sections 10 may readily be adjusted to any desired position in the leg sections 9 to vary the lengths of the legs formed by said sections, by rotating the leg sections 10 to release the expansible member from impingement with the bore of the leg sections 9, moving the leg sections 10 longitudinally of the leg sections 9 to the desired position, and securing in adjusted position by rotating the leg sections 10 to spread the expansible member into impingement with the bore of the leg sections 9, so that the adjusting of the leg sections and the securing of the leg sections in adjusted position is accomplished by the same hand of the user.

In the present illustration of the invention, the leg sections 10 are shown to have an outer diameter less than the diameter of the bore in the leg sections 9 and the head 39 on the leg sections 10 and the space formed by said difference in diameters between the sections of the same leg is closed by a ferrule 48 screw threaded onto the lower end of the leg sections 9 and slidably engaged on the leg sections 10, as shown in Figures 1 and 2. The necessity of the ferrule 48 may be overcome by providing leg sections 10 of the same outer diameter as the heads 39 of the plugs 37.

Having thus described my invention, I claim:

1. In a tripod supporting leg including telescoping sections, means to secure said leg sections in predetermined positions relative to their lengths comprising a plurality of separate like portions yieldingly connected to each other to form an expansible member corresponding to the interior dimension of and to be slidably engaged in one of the leg sections, and a member adjustably connected to the other leg section and arranged with a portion corresponding to the interior dimension of the first leg section and adapted to engage and mount the expansible member on the second leg section, the rotation of the second leg section in one direction causing adjustment of the adjustable member relative to said second leg section and uniformly expand and impinge the entire length of the expansible member against the first leg section to hold the leg sections against longitudinal movement relative to each other.

2. In tripod supporting legs including telescoping sections, means to releasably lock the leg sections against longitudinal movement carried at the end of a leg section engaged in an associated leg section, comprising a plurality of separate like members of arcuate form in cross section normally yieldingly positioned in relation to each other to form a body having a circumference corresponding to the circumference of the bore of the second leg section in which they are engaged, and a member including a shank extended through said body having a head at one end abutting an end of the arcuate members of the body and adjustably connected to and mounting said arcuate members on the end of the first leg section, whereby the rotation of the first leg section to adjust the shank member toward said first leg section draws the head thereof and the end of the first leg section to the opposite ends of and spreads the arcuate members equal distances from the longitudinal axis of said members for the entire lengths of the arcuate members and into impingement with the surface of the bore of the second leg section in which said members are engaged and thereby lock the leg sections against longitudinal movement.

3. In tripod supporting legs including a plurality of tubular sections of different diameters adapting one leg section to be slidably engaged within an associated leg section and said first leg section arranged with an annular beveled face at the end engaged in the second leg section, means mounted on the beveled end of said first leg section operative to releasably secure the leg sections in predetermined positions relative to their lengths, comprising a plurality of like members of arcuate form in cross section having beveled edges at the opposite ends and yieldingly connected and positioned relative to each other to form a circular body, and a member including a shank extended through said circular body adjustably mounted at one end in the end of said first leg section and having a head at the opposite end arranged with a beveled face to engage the beveled edge at one end of said arcuate members and the beveled edge at the opposite end of said members engaging the beveled face of the leg section, the engagement of the beveled edges of said arcuate members with the beveled faces of the shank head and the first leg section operating to contact the arcuate members with the surface of the bore of the second leg section in which they are engaged and hold the shank against rotation, and the rotation of the first leg section to which the arcuate members are connected actuating the shank head to draw the arcuate members into impingement with and frictionally lock the same to the inner surface of the bore of the second leg section in which they are engaged and locking the leg sections against longitudinal movement.

4. Means for releasably locking telescoping sections of a tripod supporting leg against longitudinal movement as claimed in claim 3, wherein the arcuate members are arranged with slots extending inwardly from the edge engaged by the shank head to a point intermediate the ends of said members to provide resilient portions adapted to be firmly impinged against the leg section.

5. Means for releasably locking telescoping sections of a tripod supporting leg against longitudinal movement as claimed in claim 3, wherein the arcuate members are yieldingly connected to each other to form a tubular body by a split annular resilient member supported by the arcuate members.

HERMAN NEUWIRTH.